April 11, 1967 G. S. DES BRISAY, JR 3,313,955

RAMP GENERATOR CIRCUITS HAVING RAPID RECOVERY AND PROVIDING LINEAR RAMPS

Filed Sept. 21, 1964 4 Sheets-Sheet 1

INVENTOR.
GEORGE S. DES BRISAY JR.,
BY
Paul M. Coble
ATTORNEY.

April 11, 1967 G. S. DES BRISAY, JR 3,313,955

RAMP GENERATOR CIRCUITS HAVING RAPID RECOVERY AND PROVIDING LINEAR RAMPS

Filed Sept. 21, 1964 4 Sheets-Sheet 2

INVENTOR.
GEORGE S. DES BRISAY JR.,
BY
Paul M. Coble
ATTORNEY.

INVENTOR.
GEORGE S. DES BRISAY JR.,
BY
Paul M. Coble
ATTORNEY.

INVENTOR.
GEORGE S. DES BRISAY JR.,
BY
Paul M. Coble
ATTORNEY

United States Patent Office 3,313,955

Patented Apr. 11, 1967

3,313,955

RAMP GENERATOR CIRCUITS HAVING RAPID RECOVERY AND PROVIDING LINEAR RAMPS

George S. Des Brisay, Jr., Manhattan Beach, Calif., assignor to Hughes Aircraft Company, Culver City, Calif., a corporation of Delaware Filed Sept. 21, 1964, Ser. No. 397,940
15 Claims. (Cl. 307—88.5)

This invention relates to wavefrom generation, and more particularly relates to circuits for generating a highly linear ramp voltage having a rapid recovery to the initial voltage level.

Ramp generators find wide application in numerous electronic systems such as radar range display and tracking circuitry, pulse delay circuitry, time base circuitry for analog-to-digital converters, and voltage controlled oscillators. In these and other applications, it is necessary that the generated ramp waveform not only be highly linear, but also that it undergoes a rapid recovery to its baseline, or reference, level. Moreover, the ramp generator should be capable of being triggered by pulses which may vary substantially in both amplitude and duration. In addition, it is desirable that the ramp generator have a simple design, which requires a relatively small number of parts, in order to minimize the size, weight, complexity and cost of the circuit.

Accordingly, it is an object of the present invention to provide a ramp generator circuit which possesses the advantageous properties set forth above.

It is a further object of the present invention to provide a ramp generator which, in addition to possessing the features set forth above, provides a step voltage coincident in time with the generated ramp voltage.

It is a still further object of the present invention to provide a ramp generator which additionally affords an extremely rapid commencement of the ramp waveform upon the arrival of a trigger pulse.

It is another object of the present invention to provide a ramp generator which possesses the additional feature of reliable operation at very low temperatures.

It is still another object of the present invention to provide a ramp generator which further provides a low output impedance and which is capable of delivering a relatively large output current.

It is still another object of the present invention to provide a ramp generator which additionally provides a baseline output voltage level of essentially zero volts, and which baseline level is highly insensitive to temperature changes.

It is yet another of the present invention to provide an astable circuit which generates a sawtooth waveform having highly linear ramp portions and rapid recovery portions.

In accordance with the foregoing objects the ramp generator of the present invention includes a switching device having a first electrode, a second electrode, and a control electrode; and an amplifying device also having a first electrode, a second electrode, and a control electrode. The first electrodes of the amplifying device and the switching device are coupled together, while the second electrode of the switching device is coupled to the control electrode of the amplifying device. An integrating capacitor is coupled between the second and control electrodes of the amplifying device. During a first time interval the switching device is biased to a non-conductive condition while the amplifying device is biased to a conductive condition, and an essentially constant charge is maintained on the capacitor. During a second time interval the switching device is biased to a conductive condition while the amplifying device is biased to a linearly amplifying condition, and the capacitor charges linearly at a predetermined rate, thereby providing a ramp voltage between the second and first electrodes of the amplifying device. Means coupled to the second electrode of the amplifying device prevents the magnitude of the ramp voltage from exceeding a preselected value; and means are provided which, in conjunction with the amplifying device, discharges the capacitor during a third time interval.

Other objects, advantages and characteristic features of the present invention will become readily apparent from the following detailed description of preferred embodiments of the invention when considered in conjunction with the accompanying drawings in which.

Figure 1:
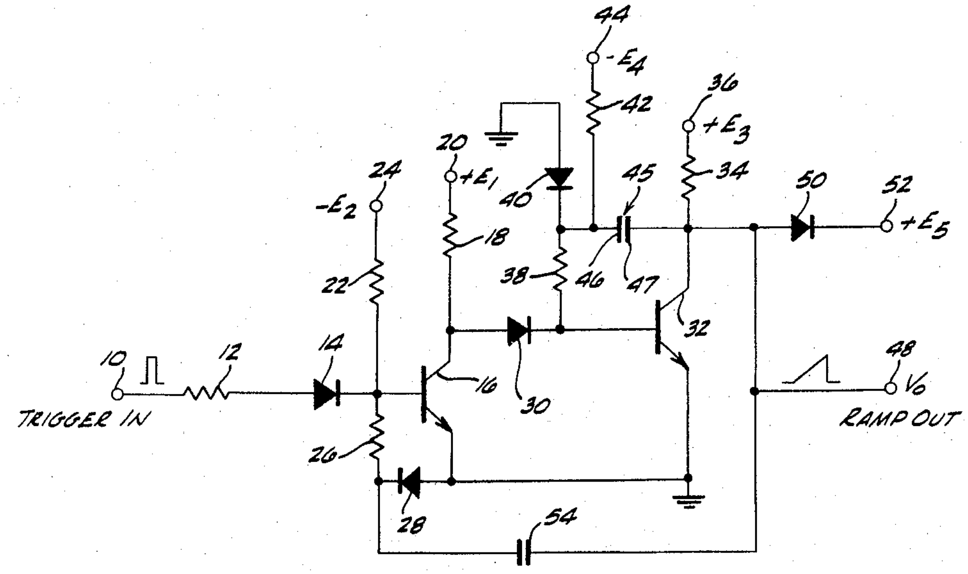
FIG. 1 is a schematic circuit diagram illustrating a ramp generator provided in accordance with one embodiment of the present invention.

Referring with more particularity to FIG. 1, a ramp generator in accordance with the present invention may be seen to include an input terminal 10 adapted to receive trigger pulses for initiating the generation of the ramp waveform. The input terminal 10 is coupled by means of an isolation resistor 12 and diode 14 to the base electrode of an NPN switching transistor 16 having its emitter electrode connected directly to a level of reference potential designated as ground. The collector electrode of the transistor 16 is coupled via a resistor 18 to a terminal 20 supplying a potential of $+E_1$ which may be of around +50 v., for example. It should be understood that although the transistor 16 is illustrated as an NPN transistor and the terminal 20 as providing a positive voltage, a PNP transistor is equally suitable in which case the terminal 20 would supply a negative voltage. A bias resistor 22 intercouples the base electrode of the transistor 16 with a terminal 24 supplying a potential of $-E_2$ which may be of around −50 v., for example, while a further bias resistor 26 and the cathode-anode path of a diode 28 are coupled in series between the base electrode of the transistor 16 and ground.

The collector electrode of the transistor 16 is also coupled by means of the anode-cathode path of a diode 30 to the base electrode of an NPN amplifying transistor 32. The collector electrode of the transistor 32 is coupled through a resistor 34 to a terminal 36 supplying a potential of $+E_3$ which may be of around +300 v., for example, while the emitter electrode of the transistor 32 is connected directly to the ground level.

The base electrode of the transistor 32 is coupled to ground via a resistor 38 in series with the cathode-anode path of a diode 40. The cathode of the diode 40 is coupled via a resistor 42 to a terminal 44 supplying a potential of $-E_4$ which may be of around −250 v., for example. An integrating capacitor 45 has one electrode 46 coupled to the cathode of the diode 40 and has its other electrode 47 coupled to the collector electrode of the transistor 32. The generated ramp voltage $V_o$, which appears at the collector electrode of the transistor 32, may be furnished at an output terminal 48 connected directly to said collector electrode. The anode-cathode path of a comparator diode 50 is coupled between the output terminal 48 and a terminal 52 which supplies a reference voltage of $+E_5$ which may be of around +50 v., for example, and which represents the maximum value to which it is desired that the generated ramp voltage rise. A feedback capacitor 54 is coupled between the output terminal 48 and the cathode of the diode 28

Figure 7:
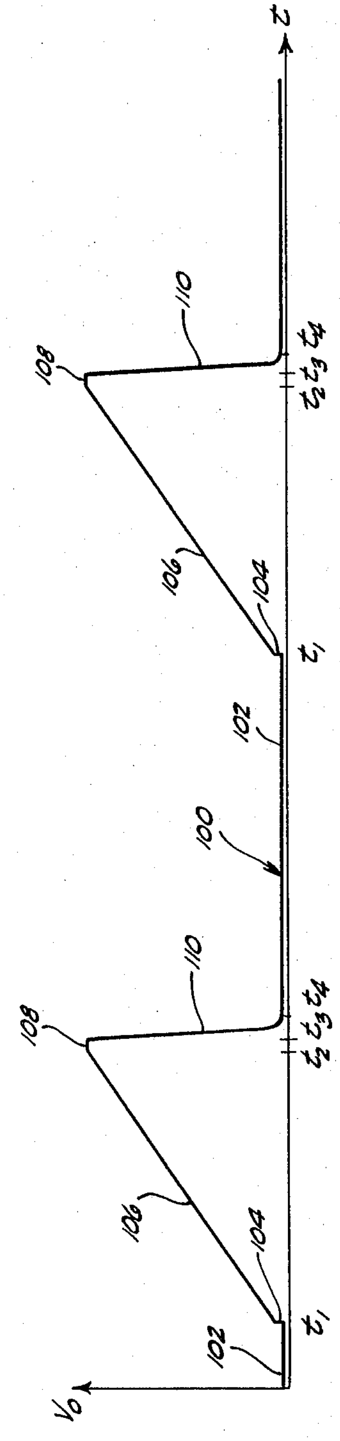
FIG. 7 is a graph of voltage vs. time illustrating the ramp output waveform provided by the circuit of FIG. 1.

In the following discussion of the operation of the circuit of FIG. 1, it will be assumed for purposes of explanation that the forward voltage drop across each conducting diode, including transistor base-emitter junctions, is 0.5 v. and that the voltage drop across the collector-emitter path of each transistor conducting in saturation is 0.2 v., it being understood that these assumptions are made solely for simplifying the discussion and are in no way to be construed as limitations. During quiescent conditions, i.e., before a trigger pulse is applied to the input terminal 10, the transistor 16 is biased to a nonconductive condition by current which flows from ground through the diode 28 and resistors 26 and 22 to the negative terminal 24, providing a potential at the base electrode of the transistor 16 slightly more negative than −0.5 v. At this time a current flow path is established from the positive terminal 20 through resistor 18 and diode 30. The current then branches into two paths: (1) through resistors 38 and 42 to the negative terminal 44, and (2) through the base-emitter junction of transistor 32 to ground. The transistor 32 is biased to a saturated conductive condition, with the collector electrode of the transistor 32 residing at a potential of around +0.2 v. and the base electrode of the transistor 32 assuming a potential of around +0.5 v. An essentially constant charge is maintained across the capacitor 45, and the potential $V_o$ between the output terminal 48 and ground resides at a baseline level of around +0.2 v., as shown by the portion 102 of the waveform 100 of FIG. 7. The magnitude of the current flow through resistor 38 is such that the cathode of the diode 40 assumes a potential of around −0.5 v. so that the diode 40 is barely cut off.

When a positive trigger pulse is applied to the input terminal 10 at time $t_1$, transistor 16 is biased into a saturated conductive condition, and the potential at the collector electrode of the transistor 16 drops from around +1.0 v. to about +0.2 v. The resultant reverse bias placed across the diode 30 cuts off the diode 30, causing a cessation of current flow through the resistor 38. The base electrode of transistor 32 is driven slightly negative, placing the transistor 32 in a linearly amplifying condition. The potential at the collector electrode of the transistor 32 then rises in step fashion by an amount which, when coupled through capacitor 45, produces the necessary current through resistor 38 to the base electrode of transistor 32 which sustains the transistor 32 in a linearly amplifying condition, and which amount is approximately one volt. Thus, a rapid rise, or jump, of one volt occurs in the output voltage $V_o$ at time $t_1$, as shown by the portion 104 of the waveform 100 of FIG. 7. The one-volt step at the terminal 48 passes through the feedback capacitor 54 to the cathode of the diode 28, raising the potential at the cathode of the diode 28 to around +0.5 v. This insures that the transistor 16 remains in a saturated conductive condition after the termination of the input trigger pulse applied to the terminal 10, thereby allowing triggering with pulses of short duration.

After the initial jump in the potential at the collector electrode of the transistor 32, the transistor 32 operates in its linear amplification region. Current then flows from the electrode 46 of the capacitor 45 through the resistor 42 to the negative terminal 44 to charge the capacitor 45 such that its electrode 47 becomes positive with respect to its electrode 46. On account of the large voltage gain of the amplifier transistor 32, the current through the resistor 42 is essentially constant. Therefore, the voltage across the capacitor 45 increases linearly, resulting in a linearly increasing, or ramp, voltage at the output terminal 48, as shown by the portion 106 of the waveform 100 of FIG. 7. The linearly increasing output voltage $V_o$ is differentiated by the feedback capacitor 54, applying an essentially constant current to resistors 26 and 22 to continue to bias the transistor 16 to a saturated conductive condition.

At time $t_2$ the voltage at the output terminal 48 has risen to a value about 0.5 v. more positive than the reference voltage $+E_5$ supplied by the terminal 52. The diode 50 then conducts, clamping the output voltage $V_o$ at this value, as shown by the portion 108 of the waveform 100 of FIG. 7. Current flow through the feedback capacitor 54 is thus terminated, and the transistor 16 is biased to a nonconductive condition from the negative terminal 24. When the transistor 16 cuts off, the potential at its collector electrode rises to around +1.0 v., rendering the diode 30 conductive. The transistor 32 is then driven toward saturation, and the resulting increase in current flow through its collector-emitter path provides a decrease in potential at its collector electrode at a time $t_3$. This decrease in potential is reflected through the integrating capacitor 45 to the cathode of the diode 40 to render the diode 40 heavily conductive. A discharge path is thus provided for the capacitor 45 from the capacitor electrode 47 through the collector-emitter path of the transistor 32 and the diode 40 to the capacitor electrode 46. As the capacitor 45 discharges, the potential at the output terminal 48 is returned to the baseline level along a portion 110 of the waveform 100 of FIG. 7. In view of the large current carrying capability of the aforementioned discharge path for the capacitor 45, the capacitor 45 is able to discharge in an extremely short time, thereby affording a rapid recovery for the generated ramp waveform. When the capacitor 45 has discharged sufficiently to return the voltage at the output terminal 48 to essentially its baseline level at time $t_4$, the diode 40 cuts off and the circuit returns to its aforementioned quiescent condition. This condition remains until the next trigger pulse is applied to the input terminal 10 at time $t_1$, causing a repetition of the afore-described sequence.

Figure 2:
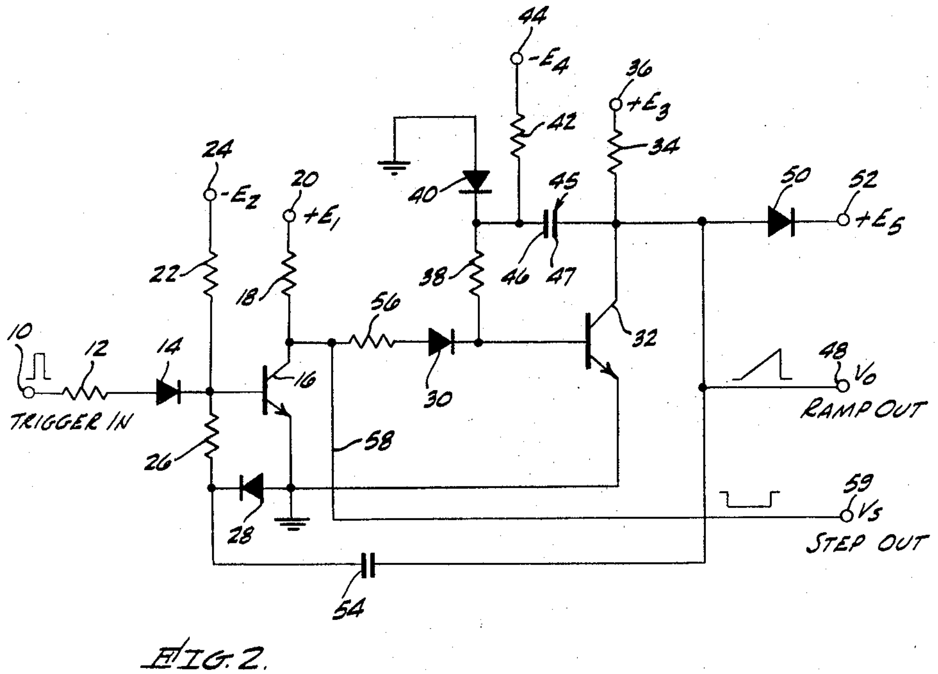
FIG. 2 is a schematic circuit diagram illustrating a ramp generator provided in accordance with another embodiment of the present invention.

It is often desired that a pedestal, or step, voltage be provided coincident in time with the generated ramp voltage, and an embodiment of the present invention in which such a pedestal voltage is afforded is illustrated in FIG. 2. The circuit of FIG. 2 is substantially the same as the circuit of FIG. 1, and those elements in the embodiment of FIG. 2 which are identical to corresponding elements in the embodiment of FIG. 1 are designated by the same reference numerals as their counterpart elements and will not be redescribed in detail. The ramp generator of FIG. 2 differs from that of FIG. 1 in that a resistor 56 is inserted between the collector electrode of the transistor 16 and the anode of the diode 30, and a lead 58 couples the collector electrode of the transistor 16 to an output terminal 59 at which a negative step, or pedestal, voltage is furnished.

The operation of the circuit of FIG. 2 is very similar to that of circuit of FIG. 1. However, during the quiescent state of the circuit in which the transistor 16 is non-conductive, on account of the voltage dividing action of the resistors 18 and 56, the collector electrode of the transistor 16 of FIG. 2 assumes a potential several volts higher than the collector electrode of the corresponding transistor in the circuit of FIG. 1. Therefore, when the transistor 16 of FIG. 2 is rendered conductive at time $t_1$, its collector potential decreases to around 0.2 v., providing a negative step voltage at the output terminal 59. When the transistor 16 is cut off after time $t_2$, its collector electrode returns to the original potential, thereby terminating the step output. The magnitude of the step voltage $V_s$ at the terminal 59 is $$|V_s|=V_{f30}+V_{be32}+\left[\frac{E_1-V_{f30}-V_{be32}}{R_{18}+R_{56}}\right]R_{56}-V_{sat16} \quad (1)$$

where $V_{f30}$ is the forward voltage across the diode 30, $V_{be32}$ is the forward voltage across the base-emitter of the transistor 32 when the transistor 32 is conducting in saturation, $V_{sat16}$ is the voltage across the collector-emitter of the transistor 16 when the transistor 16 is conducting in saturation, and $R_{18}$ and $R_{56}$ are the respective resistance values of the resistors 18 and 56.

Figure 3:
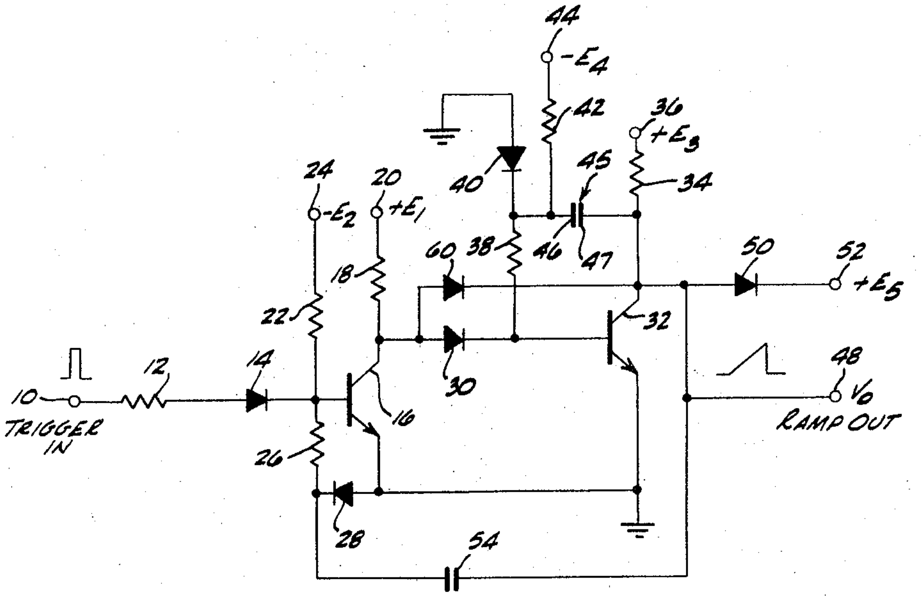
FIG. 3 is a schematic circuit diagram illustrating a ramp generator provided in acordance with still another embodiment of the present invention.

A still further embodiment of the present invention, which affords an extremely rapid commencement of the ramp waveform upon the arrival of a trigger pulse, is shown in FIG. 3. The ramp generator of FIG. 3 is substantially the same as that of FIG. 1, and those elements in the circuit of FIG. 3 which are identical to corresponding elements in the circuit of FIG. 1 are designated by the same reference numerals as their counterpart elements and will not be redescribed in detail. The circuit of FIG. 3 differs from that of FIG. 1 by adding a clamping diode 60 having its anode coupled to the collector electrode of the transistor 16 and its cathode coupled to the collector electrode of the transistor 32.

The operation of the ramp generator of FIG. 3 is very similar to that of the ramp generator of FIG. 1, except that during quiescent (baseline) conditions the cathode of the diode 60 clamps the potential at the collector electrode of the transistor 32 to around +0.5 v. This prevents saturation of the transistor 32, resulting in a more rapid commencement of the ramp waveform. It should be noted that the baseline voltage $V_{b1}$ at the output terminal 48 in the circuit of FIG. 3 is $$V_{b1}=V_{be32}+V_{f30}-V_{f60}\approx+0.5 \text{ v.} \quad (2)$$

where $V_{be32}$ is the voltage across the base-emitter of the transistor 32 when the transistor 32 is operating in its linear region, and $V_{f30}$ and $V_{f60}$ are the respective forward voltage drops across the diodes 30 and 60 when these diodes are conductive. On the other hand, the baseline voltage $V_{b1}$ for the circuit of FIG. 1 is equal to the saturated collector-emitter voltage for the transistor 32, which is approximately +0.2 v.

Figure 4:
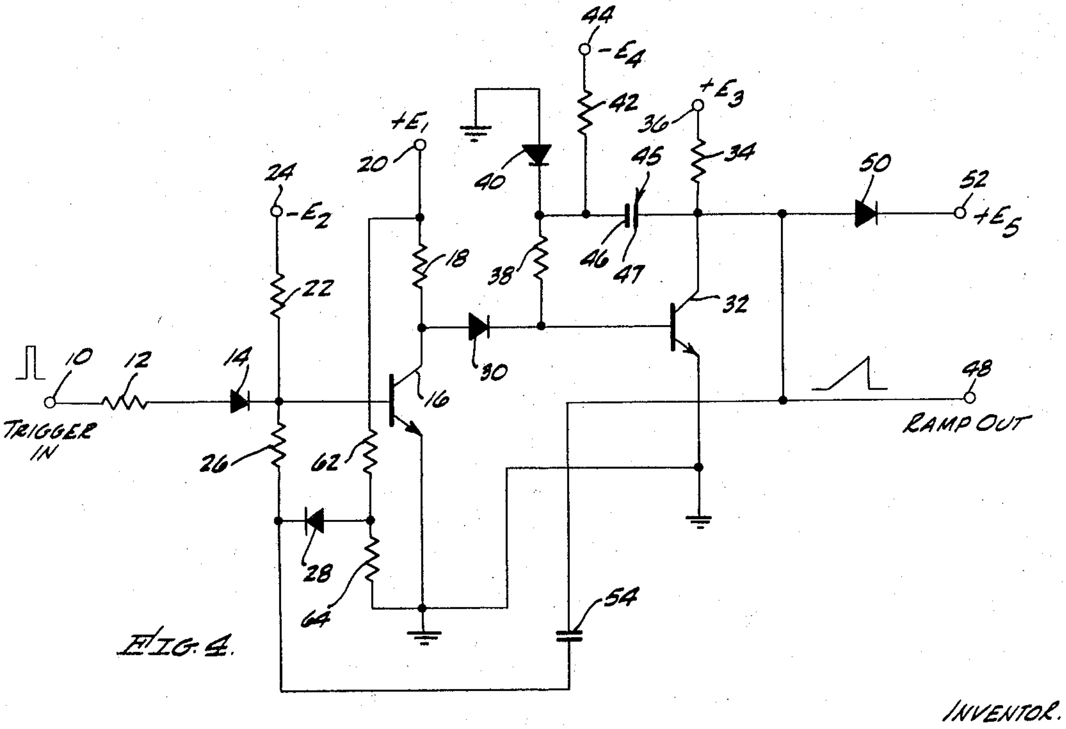
FIG. 4 is a schematic circuit diagram illustrating a ramp generator provided in accordance with yet another embodiment of the present invention.

In another embodiment of the present invention, illustrated in FIG. 4, a ramp generator similar to that of FIG. 1 is provided which affords improved operation at low temperatures. When transistor and diode circuits are operated at low temperatures, for example those of the order of −55° C., the forward voltage drops across conducting diodes and across the base-emitter junctions of conducting transistors increase from their values at room temperature. Thus, a pulse which is capable of triggering the ramp generator of FIG. 1 when operated at room temperature may be of insufficient magnitude or duration to trigger the circuit when operated at a temperature of around −55° C.

In the embodiment of FIG. 4 the bias at the base electrode of the switching transistor during its nonconductive state is altered from that used in the embodiment of FIG. 1 so that smaller and narrower pulses are capable of rendering the transistor conductive. Thus, in the embodiment of FIG. 4, in which circuit elements identical to corresponding elements in the embodiment of FIG. 1 bear the same reference numerals as their counterpart elements, a voltage dividing network consisting of series resistors 62 and 64 is coupled between the positive terminal 20 and ground, with the junction between the resistors 62 and 64 being coupled to the anode of the diode 28. The relative resistance values of the resistors 62 and 64 are selected such that the anode of the diode 28 is maintained at a potential of around +0.5 v. Thus, when the diode 28 is conductive, its cathode resides at a potential of around zero volts (rather than −0.5 v. in the circuit of FIG. 1), thereby compensating for the more stringent triggering requirements which exist at low temperatures.

Figure 5:
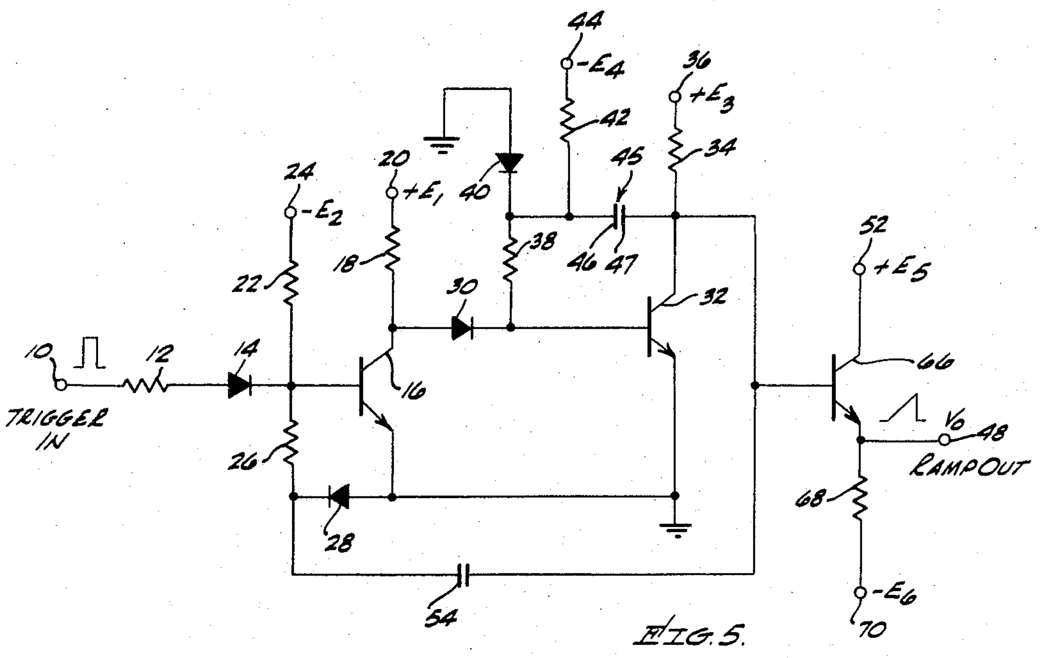
FIG. 5 is a schematic circuit diagram illustrating a ramp generator provided in accordance with a still further embodiment of the present invention.

In still another embodiment of the present invention, illustrated in FIG. 5, a ramp generator is provided which affords a low output impedance and which is capable of delivering a relatively large output current. The ramp generator of FIG. 5 is very similar to that of FIG. 1, and those elements in the circuit of FIG. 5 which are identical to corresponding elements in the circuit of FIG. 1 are designated by same reference numerals as their counterpart elements and will not be redescribed in detail. The ramp generator of FIG. 5 differs from that of FIG. 1 in that NPN emitter follower isolating transistor 66 is added. The base electrode of the emitter follower transistor 66 is connected directly to the collector electrode of the amplifying transistor 32, with a resistor 68 intercoupling the emitter electrode of the transistor 66 with a terminal 70 supplying a voltage of $-E_6$ which may be of around −250 v., for example. Also, in the embodiment of FIG. 5 the output terminal 48 at which the ramp voltage $V_o$ is provided is connected to the emitter electrode of the transistor 66. Moreover, the comparator diode 50 of FIG. 1 is eliminated, and the terminal 52 which supplies the ramp limiting reference potential of $+E_5$ is connected directly to the collector electrode of the transistor 66.

In the operation of the circuit of FIG. 5, under quiescent conditions the various circuit components function in the same manner as described above with respect to the operation of the circuit of FIG. 1. In addition, the emitter follower transistor 66 is biased to operate in its linear amplification region, with its base electrode residing at a potential of around +0.2 v. and its emitter electrode assuming a potential of around −0.3 v. After receipt of a trigger pulse at the input terminal 10, the integrating capacitor 45 commences to charge, and the potential at the collector electrode of the transistor 32 increases linearly (after its initial one volt jump) in the manner described above. On account of the voltage gain of essentially unity for the emitter follower transistor 66, the linearly increasing potential at the base electrode of the transistor 66 also appears at the emitter electrode, thereby affording the desired ramp waveform at the output terminal 48. However, on account of current amplification in the transistor 66, the output current afforded by the circuit of FIG. 5 is substantially greater than that provided by the circuit of FIG. 1. In addition, the output impedance measured between the terminal 48 and ground for the circuit of FIG. 5 is substantially less than that for the circuit of FIG. 1.

When the potential at the base electrode of the emitter follower transistor 66 becomes essentially 0.5 v. more positive than the reference voltage $+E_5$ furnished at the terminal 52, the base-collector junction of the transistor 66 becomes forward biased and functions in the same manner as the diode 50 of FIG. 1 to clamp the potential at the base electrode of the transistor 66 at this value, and hence clamp the voltage at the output terminal 48 at a level around 0.5 v. lower. The circuit of FIG. 5 then functions in the same manner as described above for the circuit of FIG. 1 with respect to the sweep recovery portion of its operating cycle to return the voltage at the output terminal 48 to its baseline level.

It is pointed out that the key features of any two or more of the embodiments of FIGS. 2, 3, 4 and 5 may be employed simultaneously to form various combinations of the respective circuits illustrated in these figures. In fact, it is highly advantageous to employ the key features of the embodiments of FIGS. 3 and 5 simultaneously, i.e., to incorporate both the clamping diode 60 of FIG. 3 and the emitter follower transistor 66 of FIG. 5 and its associated circuitry into the basic circuit of FIG. 1, because then under quiescent conditions the forward voltage drop across the diode 30 and the base-emitter junction of the transistor 32 essentially cancels the forward voltage drop across the diode 60 and the base-emitter junction of the transistor 66. Thus, not only is a baseline voltage level of approximately zero volts afforded, but also on account of the compensating nature of temperature induced changes in the characteristics of the transistors 32 and 66 and the diodes 30 and 60, a baseline level is provided which is highly insensitive to temperature.

Figure 6:
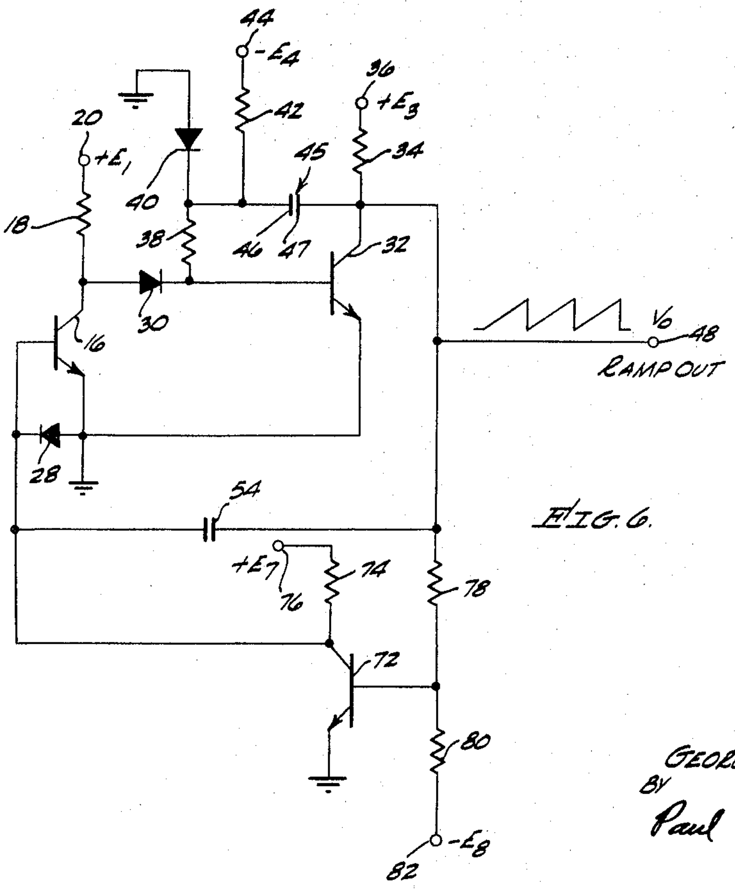
FIG. 6 is a schematic circuit diagram illustrating an astable ramp generator provided in accordance with still another embodiment of the present invention.

An astable, or free-running, ramp generator provided according to a still further embodiment of the present invention is illustrated in FIG. 6. Since much of the circuit of FIG. 6 is similar to the circuit of FIG. 1, circuit elements in the embodiment of FIG. 6 which are identical to corresponding elements in the embodiment of FIG. 1 are designated by the same reference numerals as their counterpart elements and will not be redescribed in detail. However, the input circuitry (including the input terminal 10, the resistor 12, and the diode 14), the bias circuitry for the transistor 16 (including the resistors 22 and 26 and the bias terminal 24), and the comparator diode 50 are not used in the circuit of FIG. 6. Instead, an NPN switching transistor 72 is added which has its emitter electrode grounded and its collector electrode connected directly to the base electrode of the switching transistor 16. The collector electrode of the transistor 72 is also coupled via a resistor 74 to a terminal 76 which supplies a potential of $+E_7$ which may be of around +50 v., for example. The base electrode of the transistor 72 is nected to the junction between a pair of resistors 78 and 80 which are coupled in series between the output terminal 48 and a terminal 82 which supplies a potential of $-E_8$. The magnitude of the potential $-E_8$ controls both the frequency of operation and the amplitude of the output voltage for the circuit of FIG. 6 and may be in the range of from essentially 0 volts to essentially —10 volts, for example.

In considering the operation of the astable circuit of FIG. 6 assume that the circuit is operating in that portion of its cycle in which the output voltage at the terminal 48 is increasing linearly. As was the case for the corresponding portion of the operating cycle of the circuit of FIG. 1, at this time the transistor 16 is conducting in a saturated condition; the diodes 30 and 40 are cut off; the transistor 32 is operating in its linear amplification region; and the integrating capacitor 45 is charging linearly through the resistor 42. The voltage dividing action of the series resistors 78 and 80 applies a potential to the base electrode of the transistor 72 which maintains the transistor 72 in a non-conductive condition. Sufficient current flows from the terminal 76 through the resistor 74 to the base electrode of the transistor 16 to maintain the transistor 16 conducting in a saturated condition, which is consistent with the foregoing assumed condition for the circuit.

When the linearly increasing voltage at the output terminal 48 has risen sufficiently (as determined by the control voltage $-E_8$ at the terminal 82), the junction between the resistors 78 and 80 becomes sufficiently positive to overcome the negative bias from the terminal 82 and render the transistor 72 conductive. The resulting decrease in potential at the collector electrode of the transistor 72 cuts off the transistor 16, commencing the ramp recovery process described above with respect to the operation of the circuit of FIG. 1 in which the capacitor 45 discharges through the collector-emitter path of the transistor 32 and the diode 40. As the potential at the output terminal 48 decreases, the transistor 72 is cut off by the negative potential at the terminal 82. However, the transistor 16 is not rendered conductive at this time because the current which flows from ground through the diode 28, the capacitor 54, and the transistor 32 clamps the base electrode of the transistor 16 at around —0.5 v., thereby maintaining the transistor 16 cut off. When the voltage at the output terminal 48 has returned to the baseline level, current flow through the capacitor 54 ceases, and the current from the positive terminal 76 which flows through resistor 74 to the base electrode of the transistor 16 is sufficient to render the transistor 16 conductive, thereby initiating another ramp (i.e., linearly increasing) portion of the output waveform. It should be noted that the waveform produced at the output terminal 48 for the astable circuit of FIG. 6 is similar to that shown in FIG. 7, except that the successive linearly increasing portions 106 are initiated immediately following the respective recovery portions 10, i.e., at time $t_4$.

It is pointed out that the key features of any of the embodiments of FIGS. 2, 3 and 5 may be incorporated into the astable circuit of FIG. 6 to provide various modifications of the basic voltage-controlled oscillator circuit.

It should be apparent that many additional modifications and variations may be made with respect to the circuits shown and described herein. For example, although the illustrated circuits function to generate positive going ramp waveforms, negative ramp generators may be readily afforded simply by reversing the polarities of the bias potentials and the diodes from those shown and by employing PNP transistors instead of NPN transistors. Thus, although the present invention has been shown and described with reference to particular embodiments, various changes and modifications which are obvious to a person skilled in the art to which the invention pertains are deemed to lie within the spirit, scope and contemplation of the invention as set forth in the appended claims.

What is claimed is:

1. A ramp generator comprising: a switching device having a first electrode, a second electrode, and a control electrode; an amplifying device having a first electrode, a second electrode, and a control electrode; said first electrodes being connected together; a first unidirectionally conductive device coupled between said first and said control electrodes of said switching device; a second unidirectionally conductive device coupled between said second electrode of said switching device and said control electrode of said amplifying device; a first impedance device having a first terminal coupled to said control electrode of said amplifying device and having a second terminal; a third unidirectionally conductive device coupled between said first electrode of said amplifying device and said second terminal; a first capacitance device coupled between said second terminal and said second electrode of said amplifying device; a second capacitance device coupled between said second electrode of said amplifying device and said control electrode of said switching device; a second impedance device having one terminal coupled to said second terminal and having another terminal; bias means coupled to said first and second electrodes of said switching device and said amplifying device and to said another terminal; and means coupled between said second electrode of said amplifying device and said bias means for preventing the magnitude of the potential between said second and first electrodes of said amplifying device from exceeding a preselected value.

2. A ramp generator comprising: first and second transistors each having an emitter electrode, a collector electrode, and a base electrode; said emitter electrodes being connected together; a first diode coupled between the emitter and base electrodes of said first transistor; a second diode coupled between the collector electrode of said first transistor and the base electrode of said second transistor; a first impedance device having a first terminal coupled to the base electrode of said second transistor and having a second terminal; a third diode coupled between the emitter electrode of said second transistor and said second terminal; an integrating capacitor coupled between said second terminal and the collector electrode of said second transistor; a feedback capacitor coupled between the collector electrode of said second transistor and the base electrode of said first transistor; a second impedance device having one terminal coupled to said second terminal and having another terminal; bias means coupled to the emitter and collector electrodes of said first and second transistors and to said another terminal; and means coupled between the collector electrode of said second transistor and said bias means for preventing the magnitude of the potential between the collector and emitter electrodes of said second transistor from exceeding a preselected value.

3. A circuit for generating a ramp voltage in response to a trigger signal comprising: a switching device having a first electrode, a second electrode, and a control electrode; an amplifying device having a first electrode, a second electrode, and a control electrode; said first electrodes being connected together; means for applying said trigger signal to said control electrode of said switching device; a first unidirectionally conductive device coupled between said first and said control electrodes of said switching device; a second unidirectionally conductive device coupled between said second electrode of said switching device and said control electrode of said amplifying device; a first impedance device having a first terminal coupled to said control electrode of said amplifying device and having a second terminal; a third unidirectionally conductive device coupled between said first electrode of said amplifying device and said second terminal; a first capacitance device coupled between said second terminal and said second electrode of said amplifying device; a second capacitance device coupled between said second electrode of said amplifying device and said control electrdoe of said switching device; a second impedance device having one terminal coupled to said second terminal and having another terminal; bias means coupled to said first, second, and control electrodes of said switching device, to said first and second electrodes of said amplifying device, and to said another terminal; a fourth unidirectionally conductive device coupled between said second electrode of said amplifying device and said bias means; and means coupled to said second electrode of said amplifying device for furnishing said ramp voltage.

4. A circuit for generating a ramp voltage in response to a trigger signal comprising: first and second transistors each having an emitter electrode, a collector electrode, and a base electrode; said emitter electrodes being connected together; means for applying said trigger signal to the base electrode of said first transistor; a first diode coupled between the emitter and base electrodes of said first transistor; a second diode coupled between the collector electrode of said first transistor and the base electrode of said second transistor; a first impedance device having a first terminal coupled to the base electrode of said second transistor and having a second terminal; a third diode coupled between the emitter electrode of said second transistor and said second terminal; an integrating capacitor coupled between said second terminal and the collector electrode of said second transistor; a feedback capacitor coupled between the collector electrode of said second transistor and the base electrode of said first transistor; a second impedance device having one terminal coupled to said second terminal and having another terminal; bias means coupled to the emitter, collector, and base electrodes of said first transistor, to the emitter and collector electrodes of said second transistor, and to said another terminal; a fourth diode coupled between the collector electrode of said second transistor and said bias means; and means coupled to the collector electrode of said second transistor for furnishing said ramp voltage.

5. A circuit for generating a time coincident ramp voltage and step voltage in response to a trigger signal comprising: a switching device having a first electrode, a second electrode, and a control electrode; an amplifying device having a first electrode, a second electrode, and a control electrode; said first electrodes being connected together; means for applying said trigger signal to said control electrode of said switching device; a first unidirectionally conductive device coupled between said first and said control electrodes of said switching device; a first impedance device having a first terminal coupled to said second electrode of said switching device and having a second terminal; a second unidirectionally conductive device coupled between said second terminal of said first impedance device and said control electrode of said amplifying device; a second impedance device having a first terminal coupled to said control electrode of said amplifying device and having a second terminal; a third unidirectionally conductive device coupled between said first electrode of said amplifying device and said second terminal of said second impedance device; a first capacitance device coupled between said second terminal of said second impedance device and said second electrode of said amplifying device; a second capacitance device coupled between said second electrode of said amplifying device and said control electrode of said switching device; a third impedance device having one terminal coupled to said second terminal of said second impedance device and having another terminal; bias means coupled to said first, second, and control electrodes of said switching device, to said first and second electrodes of said amplifying device, and to said another terminal; a fourth unidirectionally conductive device coupled between said second electrode of said amplifying device and said bias means; means coupled to said second electrode of said amplifying device for furnishing said ramp voltage; and means coupled to said second electrode of said switching device for furnishing said step voltage.

6. A circuit for generating a time coincident ramp voltage and step voltage in response to a trigger signal comprising: first and second transistors each having an emitter electrode, a collector electrode and a base electrode; said emitter electrodes being connected together; means for applying said trigger signal to the base electrode of said first transistor; a first diode coupled between the emitter and base electrodes of said first transistor; a first impedance device having a first terminal coupled to the collector electrode of said first transistor and having a second terminal; a second diode coupled between said second terminal of said first impedance device and the base electrode of said second transistor; a second impedance device having a first terminal coupled to the base electrode of said second transistor and having a second terminal; a third diode coupled between the emitter electrode of said second transistor and said second terminal of said second impedance device; an integrating capacitor coupled between said second terminal of said second impedance device and the collector electrode of said second transistor; a feedback capacitor coupled between the collector electrode of said second transistor and the base electrode of said first transistor; a third impedance device having one terminal coupled to said second terminal of said second impedance device and having another terminal; bias means coupled to the emitter, collector, and base electrodes of said first transistor, to the emitter and collector electrodes of said second transistor, and to said another terminal; a fourth diode coupled between the collector electrode of said second transistor and said bias means; means coupled to the collector electrode of said second transistor for furnishing said ramp voltage; and means coupled to the collector electrode of said first transistor for furnishing said step voltage.

7. A circuit for generating a ramp voltage in response to a trigger signal comprising: a switching device having a first electrode, a second electrode, and a control electrode; an amplifying device having a first electrode, a second electrode, and a control electrode; said first electrodes being connected together; means for applying said trigger signal to said control electrode of said switching device; a first unidirectionally conductive device coupled between said first and said control electrodes of said switching device; a second unidirectionally conductive device coupled between said second electrode of said switching device and said control electrode of said amplifying device; a first impedance device having a first terminal coupled to said control electrode of said amplifying device and having a second terminal; a third unidirectionally conductive device coupled between said first electrode of said amplifying device and said second terminal; a first capacitance device coupled between said second terminal and second electrode of said amplifying device; a second capacitance device coupled between said second electrode of said amplifying device and said control electrode of said switching device; a second impedance device having one terminal coupled to said second terminal and having another terminal; bias means coupled to said first, second, and control electrodes of said switching device, to said first and second electrodes of said amplifying device, and to said another terminal; a fourth unidirectionally conductive device coupled between said second electrode of said amplifying device and said bias means; and a fifth unidirectionally conductive device coupled between said second electrodes of said switching and said amplifying devices.

8. A circuit for generating a ramp voltage in response to a trigger signal comprising: first and second transistors each having an emitter electrode, a collector electrode, and a base electrode; said emitter electrodes being connected together; means for applying said trigger signal to the base electrode of said first transistor; a first diode coupled between the emitter and base electrodes of said first transistor; a second diode coupled between the collector electrode of said first transistor and the base electrode of said second transistor; a first impedance device having a first terminal coupled to the base electrode of said second transistor and having a second terminal; a third diode coupled between the emitter electrode of said second transistor and said second terminal; an integrating capacitor coupled between said second terminal and the collector electrode of said second transistor; a feedback capacitor coupled between the collector electrode of said second transistor and the base electrode of said first transistor; a second impedance device having one terminal coupled to said second terminal and having another terminal; bias means coupled to the emitter, collector, and base electrodes of said first transistor, to the emitter and collector electrodes of said second transistor, and to said another terminal; a fourth diode coupled between the collector electrode of said second transistor and said bias means; and a fifth diode coupled between the collector electrodes of said first and second transistors.

9. A circuit for generating a ramp voltage in response to a trigger signal comprising: a switching device having a first electrode, a second electrode, and a control electrode; an amplifying device having a first electrode, a second electrode, and a control electrode; said first electrodes being connected together; means for applying said trigger signal to said control electrode of said switching device; a voltage dividing device having a first terminal, a second terminal, and an intermediate terminal; said first terminal of said voltage dividing device being coupled to said first electrode of said switching device; a first unidirectionally conductive device coupled between said intermediate terminal and said control electrode of said switching device; a second unidirectionally conductive device coupled between said second electrode of said switching device and said control electrode of said amplifying device; a first impedance device having a first terminal coupled to said control electrode of said amplifying device and having a second terminal; a third unidirectionally conductive device coupled between said first electrode of said amplifying device and said second terminal of said first impedance device; a first capacitance device coupled between said second terminal of said first impedance device and said second electrode of said amplifying device; a second capacitance device coupled between said second electrode of said amplifying device and said control electrode of said switching device; a second impedance device having one terminal coupled to said second terminal of said first impedance device and having another terminal; bias means coupled to said first, second, and control electrodes of said switching device, to said first and second electrodes of said amplifying device, to said second terminal of said voltage dividing device, and to said another terminal; a fourth unidirectionally conductive device coupled between said second electrode of said amplifying device and said bias means; and means coupled to said second electrode of said amplifying device for furnishing said ramp voltage.

10. A circuit for generating a ramp voltage in response to a trigger signal comprising: first and second transistors each having an emitter electrode, a collector electrode, and a base electrode; said emitter electrodes being connected together; means for applying said trigger signal to the base electrode of said first transistor; voltage dividing means having a first terminal, a second terminal, and an intermediate terminal; said first terminal of said voltage dividing means being coupled to the emitter electrode of said first transistor; a first diode coupled between said intermediate terminal and the base electrode of said first transistor; a second diode coupled between the collector electrode of said first transistor and the base electrode of said second transistor; a first impedance device having a first terminal coupled to the base electrode of said second transistor and having a second terminal; a third diode coupled between the emitter electrode of said second transistor and said second terminal of said first impedance device; an integrating capacitor coupled between said second terminal of said first impedance device and the collector electrode of said second transistor; a feedback capacitor coupled between the collector electrode of said second transistor and the base electrode of said first transistor; a second impedance device having one terminal coupled to said second terminal of said first impedance device and having another terminal; bias means coupled to the emitter, collector, and base electrodes of said first transistor, to the emitter and collector electrodes of said second transistor, to said second terminal of said voltage dividing means, and to said another terminal; a fourth diode coupled between the collector electrode of said second transistor and said bias means; and means coupled to the collector electrode of said second transistor for furnishing said ramp voltage.

11. A circuit for generating a ramp voltage in response to a trigger signal comprising: a switching device having a first electrode, a second electrode and a control electrode; an amplifying device having a first electrode, a second electrode, and a control electrode; said first electrodes being connected together; means for applying said trigger signal to said control electrode of said switching device; a first unidirectionally conductive device coupled between said first and said control electrodes of said switching device; a second unidirectionally conductive device coupled between said second electrode of said switching device and said control electrode of said amplifying device; a first impedance device having a first terminal coupled to said control electrode of said amplifying device and having a second terminal; a third unidirectionally conductive device coupled between said first electrode of said amplifying device and said second terminal; a first capacitance device coupled between said second terminal and said second electrode of said amplifying device; a second capacitance device coupled between said second electrode of said amplifying device and said control electrode of said switching device; a second impedance device having one terminal coupled to said second terminal and having another terminal; bias means coupled to said first, second, and control electrodes of said switching device, to said first and second electrodes of said amplifying device, and to said another terminal; and signal processing means having a voltage gain of essentially unity coupled between said second electrode of said amplifying device and said bias means for providing current amplification, for furnishing said ramp voltage, and for preventing said ramp voltage from exceeding a preselected value.

12. A circuit for generating a ramp voltage in response to a trigger signal comprising: a switching device and first and second amplifying devices, each of said switching and amplifying devices having a first electrode, a second electrode, and a control electrode; said first electrodes of said switching device and said first amplifying device being connected together; said control electrode of said second amplifying device being coupled to said second electrode of said first amplifying device; means for applying said trigger signal to said control electrode of said switching device; a first unidirectionally conductive device coupled between said first and said control electrodes of said switching device; a second unidirectionally conductive device coupled between said second electrode of said switching device and said control electrode of said first amplifying device; a first impedance device having a first terminal coupled to said control electrode of said first amplifying device and having a second terminal; a third unidirectionally conductive device coupled between said first electrode of said first amplifying device and said second terminal; a first capacitance device coupled between said second terminal and said second electrode of said first amplifying device; a second capacitance device coupled between said second electrode of said first amplifying device and said control electrode of said switching device; a second impedance device having one terminal coupled to said second terminal and having another terminal; a third impedance device having a first terminal coupled to said first electrode of said second amplifying device and having a second terminal; bias means coupled to said first, second, and control electrodes of said switching device, to said first and second electrodes of said first amplifying device, to said second electrode of said second amplifying device, to said second terminal of said third impedance device, and to said another terminal; and means coupled to said first electrode of said second amplifying device for furnishing said ramp voltage.

13. A circuit for generating a ramp voltage in response to a trigger signal comprising: first, second and third transistors each having an emitter electrode, a collector electrode, and a base electrode; the emitter electrodes of said first and second transistors being connected together and the base electrode of said third transistor being coupled to the collector electrode of said second transistor; means for applying said trigger signal to the base electrode of said first transistor; a first diode coupled between the emitter and base electrodes of said first transistor; a second diode coupled between the collector electrode of said first transistor and the base electrode of said second transistor; a first impedance device having a first terminal coupled to the base electrode of said second transistor having a second terminal; a third diode coupled between the emitter electrode of said second transistor and said second terminal; an integrating capacitor coupled between said second terminal and the collector electrode of said second transistor; a feedback capacitor coupled between the collector electrode of said second transistor and the base electrode of said first transistor; a second impedance device having one terminal coupled to said second terminal and having another terminal; a third impedance device having a first terminal coupled to the emitter electrode of said third transistor and having a second terminal; bias means coupled to the emitter, collector, and base electrodes of said first transistor, to the emitter and collector electrodes of said second transistor, to the collector electrode of said third transistor, to said second terminal of said third impedance device, and to said another terminal; and means coupled to the emitter electrode of said third transistor for furnishing said ramp voltage.

14. An astable circuit for generating a sawtooth voltage comprising: first and second switching devices and an amplifying device, each of said switching and amplifying devices having a first electrode, a second electrode, and a control electrode; said first electrodes of said first and second switching devices and said amplifying device being connected together; said second electrode of said second switching device being coupled to said control electrode of said first switching device; a first unidirectionally conductive device coupled between said first and said control electrodes of said first switching device; a second unidirectionally conductive device coupled between said second electrode of said first switching device and said control electrode of said amplifying device; a first impedance device having a first terminal coupled to said control electrode of said amplifying device and having a second terminal; a third unidirectionally conductive device coupled between said first electrode of said amplifying device and said second terminal; a first capacitance device coupled between said second terminal and said second electrode of said amplifying device; a second capacitance device coupled between said second electrode of said amplifying device and said control electrode of said first switching device; a second impedance device having one terminal coupled to said second terminal and having another terminal; bias means coupled to said first and second electrodes of said first and second switching devices and of said amplifying device and to said another terminal; a voltage dividing device having a first terminal coupled to said second electrode of said amplifying device, a second terminal coupled to said bias means, and an intermediate terminal coupled to said control electrode of said second switching device; and means coupled to said second electrode of said amplifying device for furnishing said sawtooth voltage.

15. An astable circuit for generating a sawtooth voltage comprising: first, second and third transistors each having an emitter electrode, a collector electrode, and a base electrode; the emitter electrodes of said first, second, and third transistors being connected together; the collector electrode of said third transistor being coupled to the base electrode of said first transistor; a first diode coupled between the emitter and base electrodes of said first transistor; a second diode coupled between the collector electrode of said first transistor and the base electrode of said second transistor; a first impedance device having a first terminal coupled to the base electrode of said second transistor and having a second terminal; a third diode coupled between the emitter electrode of said second transistor and said second terminal; an integrating capacitor coupled between said second terminal and the collector electrode of said second transistor; a feedback capacitor coupled between the collector electrode of said second transistor and the base electrode of said first transistor; a second impedance device having one terminal coupled to said second terminal and having another terminal; bias means coupled to the emitter and collector electrodes of said first, second, and third transistors and to said another terminal; voltage dividing means having a first terminal coupled to the collector electrode of said second transistor, a second terminal coupled to said bias means, and an intermediate terminal coupled to the base electrode of said third transistor, and means coupled to the collector electrode of said second transistor for furnishing said sawtooth voltage.

References Cited by the Examiner

UNITED STATES PATENTS

| | | | |
|---|---|---|---|
| 2,681,411 | 6/1954 | Washburn | 328—181 X |
| 2,905,817 | 9/1959 | Smith | 328—181 X |
| 2,961,608 | 11/1960 | Goldman | 328—35 |

ARTHUR GAUSS, *Primary Examiner.*

S. MILLER, *Assistant Examiner.*